US011790355B2

(12) United States Patent
Tatum

(10) Patent No.: US 11,790,355 B2
(45) Date of Patent: Oct. 17, 2023

(54) COIN COUNTING LOTTERY MACHINE WITH CRYPTOCURRENCY CAPABILITY

(71) Applicant: Mark Tatum, Cloudcroft, NM (US)

(72) Inventor: Mark Tatum, Cloudcroft, NM (US)

( * ) Notice: Subject to any disclaimer, the term of this patent is extended or adjusted under 35 U.S.C. 154(b) by 0 days.

(21) Appl. No.: 17/570,459

(22) Filed: Jan. 7, 2022

(65) Prior Publication Data
US 2023/0004956 A1 Jan. 5, 2023

Related U.S. Application Data

(60) Provisional application No. 63/217,847, filed on Jul. 2, 2021.

(51) Int. Cl.
*G06Q 20/00* (2012.01)
*G06Q 20/38* (2012.01)
(Continued)

(52) U.S. Cl.
CPC ......... *G06Q 20/381* (2013.01); *G06Q 20/045* (2013.01); *G06Q 20/18* (2013.01);
(Continued)

(58) Field of Classification Search
CPC ............... G06Q 20/381; G06Q 20/045; G06Q 30/0607; G06Q 30/0609; G07F 17/329; G07F 17/42
(Continued)

(56) References Cited

U.S. PATENT DOCUMENTS

| 5,564,546 A * | 10/1996 | Molbak | G07F 9/002 |
| | | | 194/347 |
| 2005/0145463 A1* | 7/2005 | Gerrity | B08B 5/00 |
| | | | 194/302 |

(Continued)

FOREIGN PATENT DOCUMENTS

WO WO-2019160823 A1 * 8/2019 ......... G06F 16/2379

OTHER PUBLICATIONS

Coin Counting and Sorting Machine Published in: 2019 9th International Conference on Emerging Trends in Engineering and Technology—Signal and Information Processing (ICETET—SIP—19) (pp. 1-4) Authors: Anupa Kavale • Shraddha Shukla • Prachi Bramhe (Year: 2019).*

(Continued)

*Primary Examiner* — Bruce I Ebersman
*Assistant Examiner* — John A Anderson
(74) *Attorney, Agent, or Firm* — Brennan, Manna & Diamond, LLC

(57) ABSTRACT

The present invention relates to a novel coin counting lottery vending machine with selective cryptocurrency support. The machine combines the functions of enabling users to buy lottery tickets using coins, cash and/or cryptocurrency and converting coins into cash or cryptocurrency. The machine includes a coin receptacle, a ticket scanner to check the winning status of a previously purchased ticket, a ticket slot for receiving play slips for draw tickets, a cash slot, a touch screen, and a dispensing tray. The machine can also be connected to a lottery provider server for checking status of a ticket and storing information about dispensed tickets. The machine can also be connected to a cryptocurrency exchange for performing cryptocurrency transactions.

7 Claims, 6 Drawing Sheets

(51) Int. Cl.
    *G06Q 30/0601*    (2023.01)
    *G06Q 50/34*    (2012.01)
    *G06Q 20/18*    (2012.01)
    *G07F 17/42*    (2006.01)
    *G07F 17/32*    (2006.01)
    *G06Q 20/04*    (2012.01)

(52) U.S. Cl.
    CPC ..... *G06Q 30/0607* (2013.01); *G06Q 30/0609* (2013.01); *G06Q 50/34* (2013.01); *G07F 17/329* (2013.01); *G07F 17/42* (2013.01)

(58) Field of Classification Search
    USPC .......................................................... 705/39
    See application file for complete search history.

(56) References Cited

U.S. PATENT DOCUMENTS

| | | | | |
|---|---|---|---|---|
| 2013/0204683 A1* | 8/2013 | Blakeney | ............... | G06Q 50/34 |
| | | | | 705/14.14 |
| 2016/0012465 A1* | 1/2016 | Sharp | ................... | G06Q 20/321 |
| | | | | 705/14.17 |

OTHER PUBLICATIONS

Design of Blockchain Lottery for Thai Government Published in: 2019 Joint International Conference on Digital Arts, Media and Technology with ECTI (ECTI DAMT-NCON) (pp. 9-12) Authors: (Year: 2019).*

* cited by examiner

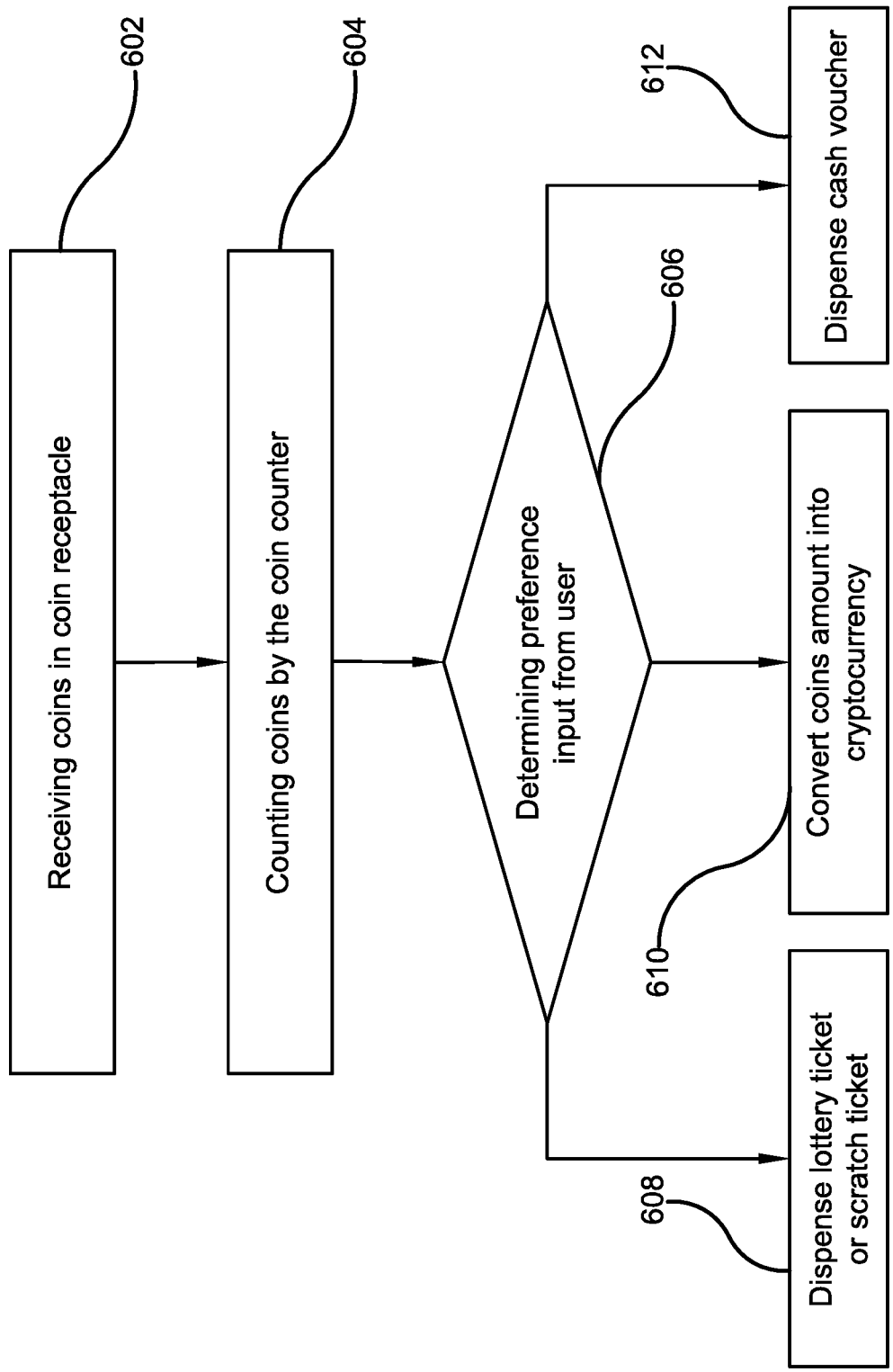

COIN COUNTING LOTTERY MACHINE WITH CRYPTOCURRENCY CAPABILITY

CROSS-REFERENCE TO RELATED APPLICATION

The present application claims priority to, and the benefit of, U.S. Provisional Application No. 63/217,847, which was filed on Jul. 2, 2021 and is incorporated herein by reference in its entirety.

FIELD OF THE INVENTION

The present invention relates generally to the field of lottery vending machines. More specifically, the present invention relates to a novel lottery vending machine that includes an integrated coin counter and cryptocurrency transaction capability. The machine increases lottery ticket sales for the state by enticing individuals who want to convert coins into cash, lottery tickets, or cryptocurrency. The machine features a coin receptacle or slot and a coin counter for coins and a connection with cryptocurrency exchange for buying tickets using cryptocurrency, converting coins into cryptocurrency, and/or accumulating coins for purchase of lottery tickets. Accordingly, the present disclosure makes specific reference thereto. Nonetheless, it is to be appreciated that aspects of the present invention are also equally applicable to other like applications, devices, and methods of manufacture.

BACKGROUND

By way of background, lottery providers and operators have traditionally used external lottery processing systems to operate lottery games and process lottery-related transactions. Generally, lottery retailers distribute tickets, collect payments, and earn payments from lottery operators. Presently, lottery vending machines are more commonly used by individual users/consumers. The lottery vending machines can be installed in multiple locations, thereby allowing easy and autonomous accessibility. Further, the vending machines do not require to be attended by retailers or operators. However, presently available lottery vending machines are limited to only accept cash and to dispense lottery tickets in exchange of same.

Lottery enthusiasts many times have coins that they want to use for lottery tickets. Such individuals desire to use their coins for buying lottery tickets, which is a feature not offered by current vending machines. Therefore, individuals need to find a separate coin counting machine or another commercial exchange to convert coins into cash, and then use the cash to purchase the lottery tickets. Even in places where lottery vending machines are placed, space is typically not adequate to place a separate coin counting machine next to the lottery vending machine. Individuals desire a single machine that can dispense lottery tickets and count coins. This would also increase sales revenue of lottery operators as individuals will end up buying more tickets through convenient use of coins.

With the advent of cryptocurrencies, individuals want to use their cryptocurrency accounts to buy lottery tickets and interchange coins with crypto and vice versa. Existing lottery vending machines do not have the capability to handle cryptocurrency transactions, and therefore the use of cryptocurrency is not possible for purchasing lottery tickets or converting from coins on such vending machines.

Therefore, there exists a long felt need in the art for a lottery vending machine that combines the functions of selling lottery tickets and counting/summing coins. There is also a long felt need in the art for a lottery vending machine that supports cryptocurrency transactions. Additionally, there is a long felt need in the art for a lottery vending machine that can be easily placed in small or confined spaces. Moreover, there is a long felt need in the art for a lottery machine that entices individuals to buy lottery tickets who want to convert coins into lottery tickets. Further, there is a long felt need in the art for a lottery dispensing machine that offers a way to count, total and display coin currency amounts. Furthermore, there is a long felt need in the art for an improved lottery vending machine that saves time for users in buying lottery tickets and counting coins. Finally, there is a long felt need in the art for a lottery machine that reduces the current footprint of having two different machines to count coins and sell lottery tickets.

The subject matter disclosed and claimed herein, in one embodiment thereof, comprises a coin counting lottery vending machine with integrated cryptocurrency capability. The coin counting lottery vending machine includes a display showing lottery tickets for selection by a user of the machine, a cash deposit slot for receiving or depositing bills for purchasing tickets, a ticket scanner to check the winning status of a previously purchased ticket, a ticket slot for receiving play slips for draw tickets, a coin receptacle for receiving or depositing coins, a coin counter for counting and summing up the received coins, a touch screen display for displaying one or more counts of coins, value of coins, and options for transactions. The machine is further configured to dispense a cash voucher/currency equivalent to received coins when a cash transaction option is selected by the user on the touch screen, dispense a lottery ticket when lottery ticket purchase option is selected by the user on the touch screen and purchasing cryptocurrency when cryptocurrency option is selected by the user. The machine can be connected to a central server and a cryptocurrency exchange for providing tickets and performing cryptocurrency transactions.

In this manner, the coin counting lottery machine of the present invention accomplishes all of the forgoing objectives and provides users with a lottery vending machine that provides a convenient way for a user to both cash in coins and purchase lottery tickets, while also providing cryptocurrency transactions. The machine saves users time by combining two tasks of buying lottery tickets and finding a coin counting and summing machine. The machine helps in increasing revenues and capture more monies by adding in the coin counting feature to entice more lottery ticket buyers.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a coin counting lottery vending machine. The coin counting lottery vending machine further comprising a display showing lottery tickets for selection by a user of the machine, a cash deposit slot for receiving or depositing bills for purchasing tickets, a ticket scanner to check the winning status of a previously purchased ticket, a ticket slot for receiving play slips for draw tickets, a coin receptacle for receiving or depositing coins, a coin counter for counting and summing the received coins, a touch screen display for displaying one or more counts of coins, value of coins, and options for transactions. The machine is further configured to dispense a cash voucher/currency equivalent to a summation of received coins when a cash transaction option is selected by the user on the touch screen, dispense a lottery ticket when the lottery ticket purchase option is selected by the user on the touch screen, and purchasing cryptocurrency when the cryptocurrency option is selected by the user.

In yet another embodiment, the machine includes a dispenser tray for dispensing the cash voucher/currency or the lottery tickets.

In yet another embodiment, the machine displays one or more available lottery draw tickets and scratch-off tickets.

In yet another embodiment, the machine includes a ticket scanner for scanning the play slip ticket numbers for draw tickets received from the ticket slot, an identity scanner for detecting an identification number of the user and a bill scanner for detecting amount of the bill received through the cash deposit slot.

In yet another embodiment of the present invention, a lottery vending machine with integrated coin counting and cryptocurrency transactions capability is disclosed. The vending machine includes a coin receptacle or slot for receiving or depositing coins, a coin counter for counting and summing coins, a touchscreen for displaying coin count/sum and a plurality of options wherein the options include a first option of purchasing one or more lottery tickets in exchange of the coins, a second option of purchasing cryptocurrency in exchange for the coins and a third option of purchasing a cash voucher/currency in exchange for the coins. The one or more lottery tickets can be selected from a display of the vending machine and a dispenser tray dispenses the purchase of one or more lottery tickets or dispenses the purchase of the cash voucher/currency.

In yet another embodiment, a lottery vending machine enabling a user to insert coins into the machine for purchasing lottery tickets, cryptocurrency and cash voucher/currency is disclosed. The machine is a component of a lottery provider and is connected to a central server and the machine is further connected to a cryptocurrency exchange. The machine transmits the coin count information along with user identification to the central server where a coin information database stores the coin count information and a user database stores user information of the machine.

In yet another embodiment, the vending machine includes a microprocessor for controlling the operation of the machine.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which:

FIG. 6 illustrates a flow diagram showing exemplary steps performed by the coin counting lottery machine of the present invention in processing of the inserted coins through the coin receptacle or slot in accordance with the disclosed architecture.

DETAILED DESCRIPTION OF THE PRESENT INVENTION

Figure 1:
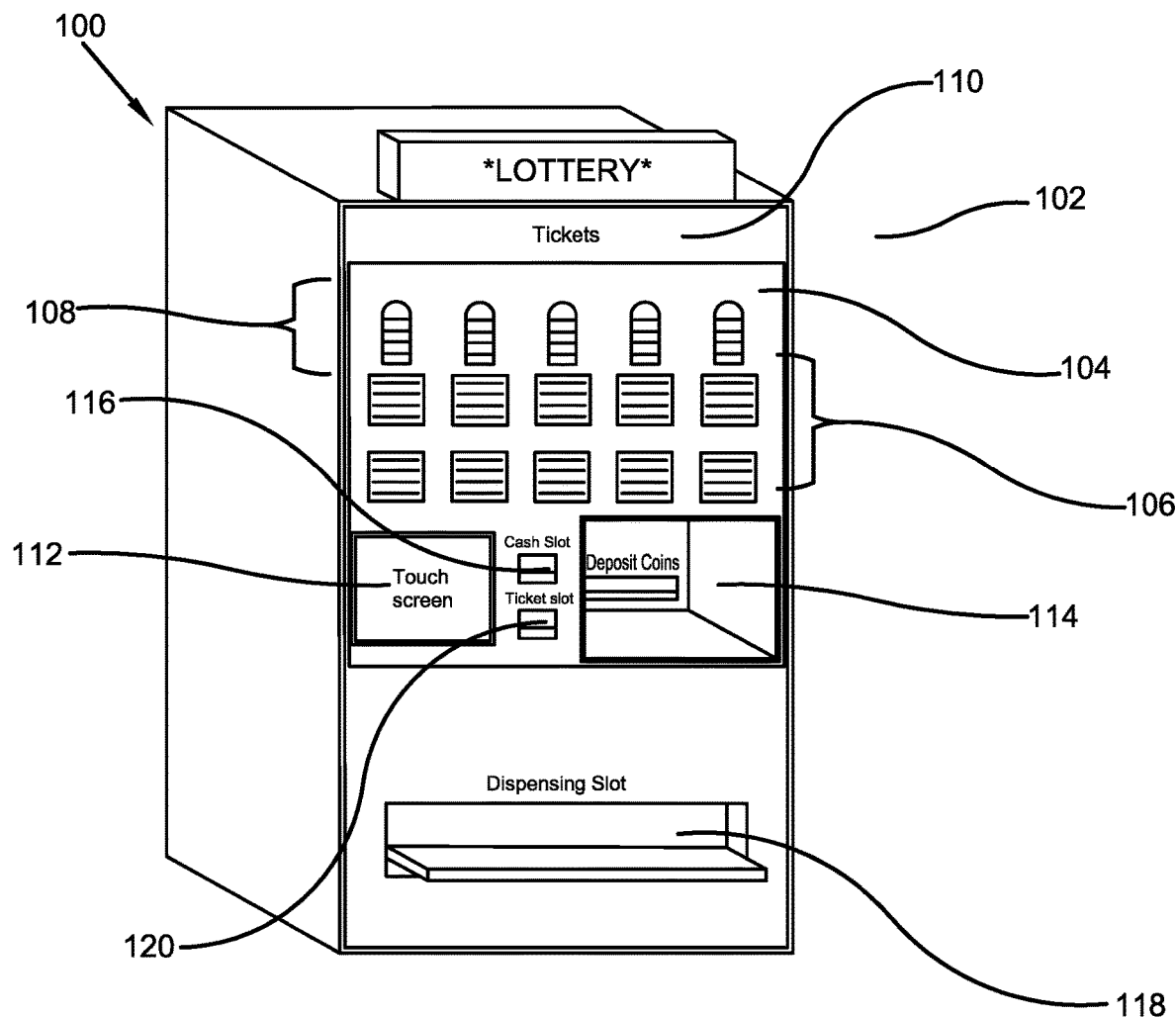
FIG. 1 illustrates a perspective view of one potential embodiment of a lottery vending machine with integrated coin counter of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a lottery vending machine that combines the functions of selling lottery tickets and counting/summing coins. There is also a long felt need in the art for a lottery vending machine that supports cryptocurrency transactions. Additionally, there is a long felt need in the art for a lottery vending machine that can be easily placed in small or confined spaces. Moreover, there is a long felt need in the art for a lottery machine that entices individuals to buy lottery tickets who want to convert coins into lottery tickets. Further, there is a long felt need in the art for a lottery dispensing machine that offers a way to count, total and display coin currency amounts. Furthermore, there is a long felt need in the art for an improved lottery vending machine that saves time for users in buying lottery tickets and counting coins. Finally, there is a long felt need in the art for a lottery machine that reduces the current footprint of having two different machines to count/sum deposited coins and sell lottery tickets.

The present invention, in one exemplary embodiment, is a novel lottery vending machine with integrated coin counting and cryptocurrency transactions capability. The vending machine features a coin receptacle for receiving or depositing coins, a coin counter for counting/summing deposited coins, a cash slot for receiving or depositing cash, a ticket scanner to check the winning status of a previously purchased ticket, a ticket slot for receiving play slips for draw tickets, a touch screen for displaying the coin count/sum and a plurality of options wherein the options include a first option of purchasing one or more lottery tickets in exchange of the coins, a second option of purchasing cryptocurrency in exchange for the coins and a third option of purchasing a cash voucher/currency in exchange of the coins. The one or more lottery tickets are selected from the display of the vending machine and a dispenser tray dispenses the purchase of one or more lottery tickets or purchased cash voucher/currency.

Referring initially to the drawings, FIG. 1 illustrates a perspective view of one potential embodiment of a lottery vending machine with integrated coin counter 100 of the present invention in accordance with the disclosed architecture. The lottery vending machine with integrated coin counter 100 of the present invention is designed for dispensing lottery tickets and counting coins/cash. The machine 100 also enables a user to purchase and sell cryptocurrencies such as Bitcoin, Litecoin, Ethereum and many more, and use cryptocurrencies to buy lottery tickets. Accordingly, the machine 100 can be used by individuals for converting coins into cash or alternatively can be used for purchasing lottery tickets. The machine 100 can also be used for depositing cash for purchasing lottery tickets and scanning a ticket to check whether the ticket has a winning number associated therewith.

More specifically, the machine 100 includes a housing 102 made from a durable material such as a metal, alloy, heavy-duty plastic or the like. The machine 100 includes a front face 104 that can display scratch-off gameplay options 106 and lottery draw ticket options 108. The front face 104 displays a banner 110 indicating choices to users to buy lottery tickets from the vending machine 100. The machine 100 includes a touch screen 112 for displaying various parameters associated with the machine 100 and also enabling a user to select between options of buying scratch tickets 106, buying lottery draw tickets 108, depositing coins, checking winning tickets and depositing cash in the form of bills as described in detail later in the disclosure. The touch screen 112 is configured to display options for using cryptocurrency for buying lottery tickets. In one embodiment, the front face 104 displaying scratch card gameplay options 106 and lottery tickets options 108 (collectively referred to as lottery options) can be a touch surface enabling a user to touch a specific type of ticket option to purchase from the lottery vending machine 100.

Figure 3:
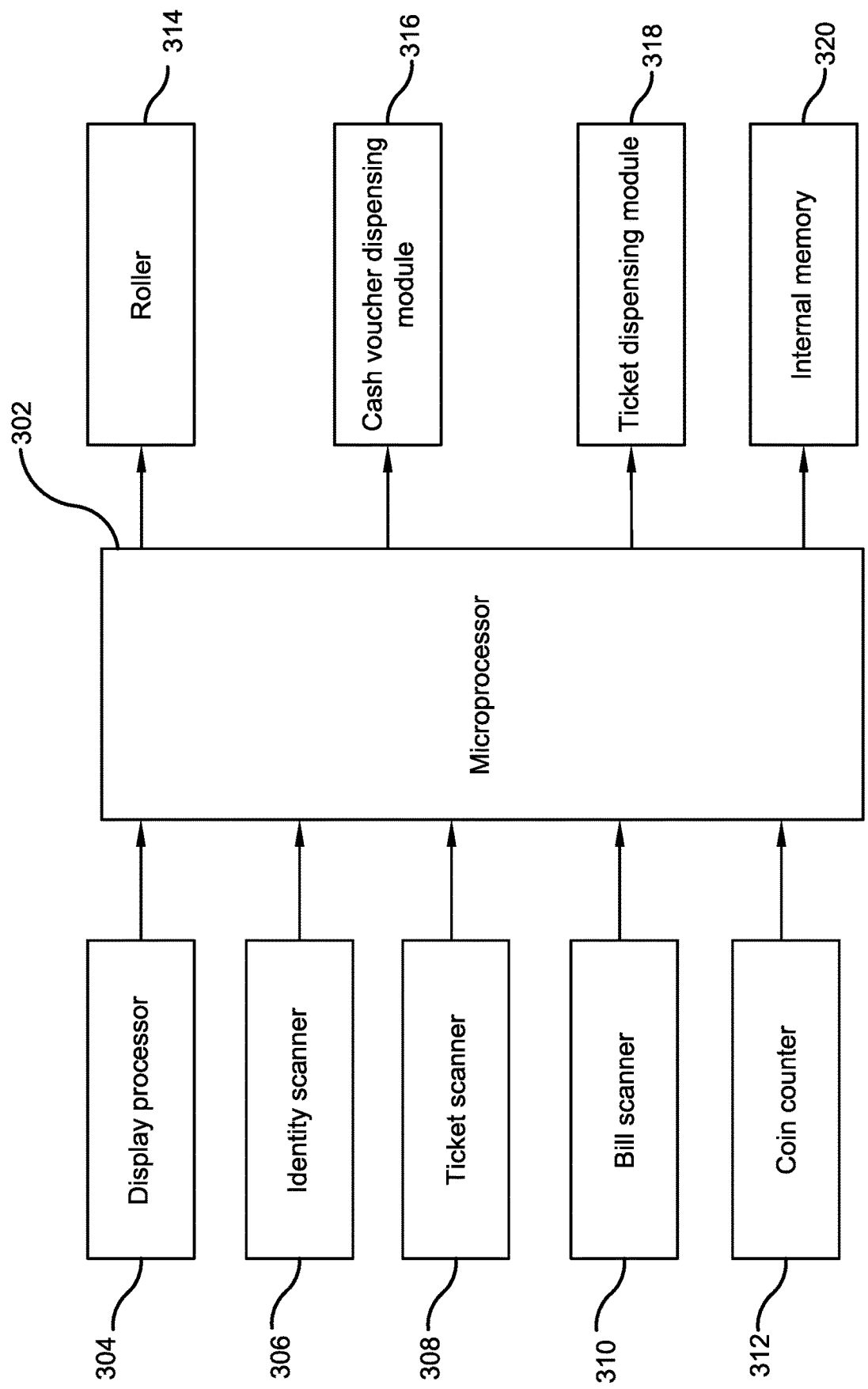
FIG. 3 illustrates a block diagram showing internal electronic components essential for working of the coin counting lottery machine in accordance with the disclosed architecture.

The machine 100 provides a coin receptacle or slot 114 for depositing coins into the machine 100. The machine 100 includes the capability of counting inserted coins, and their respective values, by the user using a built-in coin counter as best illustrated in FIG. 3, thereby allowing the user to either purchase new lottery tickets or cash voucher/currency from the coins. In the present embodiment, the coins can also be used to purchase one or more cryptocurrencies. The coin counting capability of the machine 100 is a unique feature as the user can be enticed to purchase lottery tickets using the coins. The touch screen 112 is configured to display the count and value of coins when the coin counter embedded in the machine 100 successfully counts the deposited coins. The ticket dispenser tray 118 is used for dispensing cash voucher/currency when the user selects to cash in the deposited coins. It should be noted that the dispensed cash voucher/currency can be used for purchasing tickets from the machine 100 and thereby facilitates the users to purchase more tickets.

The machine 100 includes a cash deposit slot 116 disposed on the front face 104 and is configured to receive bills or bank notes enabling users to purchase lottery tickets. The touch screen 112 is configured to display the acceptable denominations of the currency that can be accepted by the machine 100. The machine 100 includes an internal scanner that scans the currency inserted in the cash deposit slot 116 and thus enables the machine 100 to dispense one or more corresponding lottery tickets through the ticket dispenser tray 118. The deposited cash through the cash deposit slot 116 can also be used for purchasing cryptocurrencies.

Figure 2:
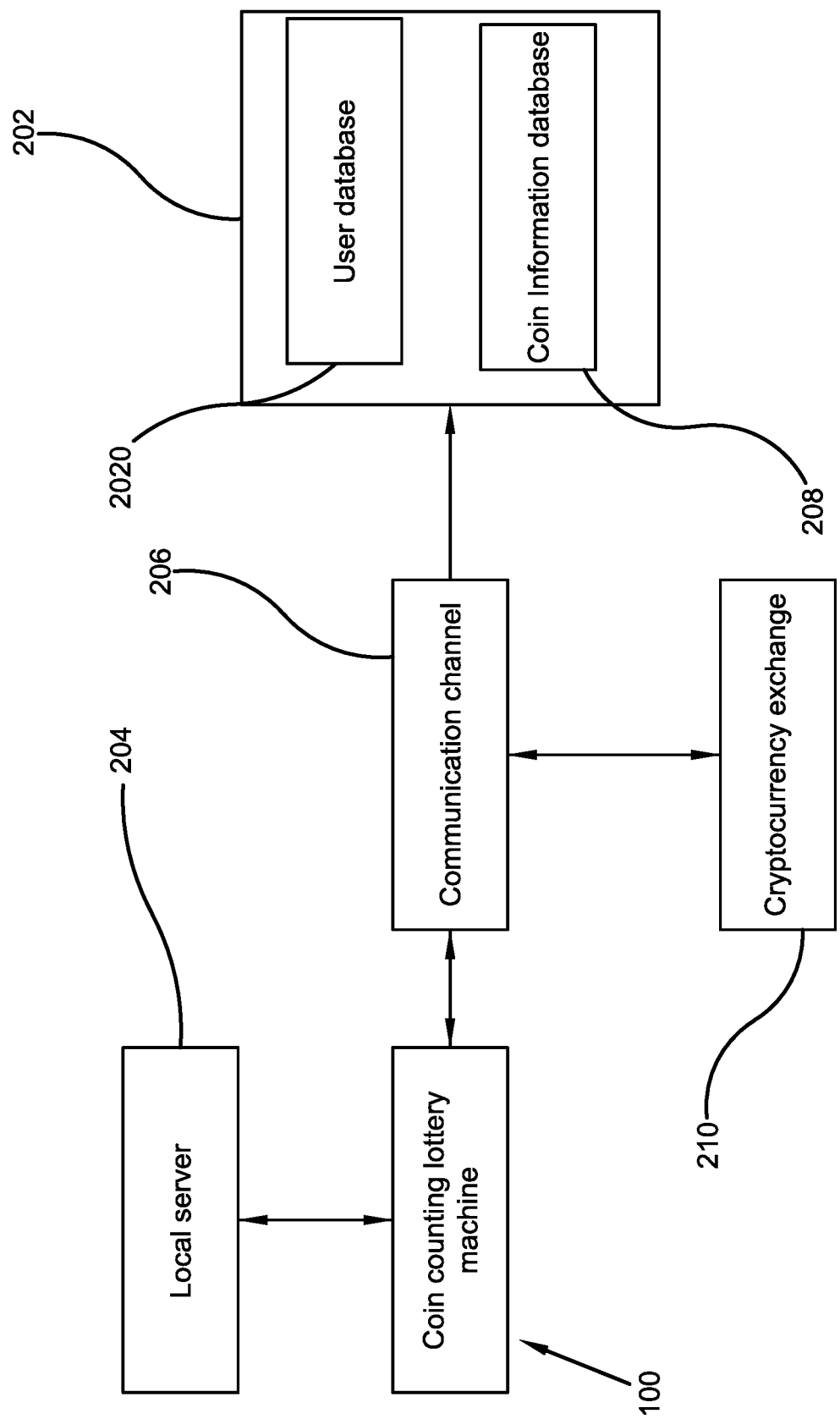
FIG. 2 illustrates a schematic view showing network connection of the lottery vending machine with the lottery server provider in accordance with the disclosed architecture.

The machine 100 is connected to one or more lottery service provider servers as illustrated in FIG. 2 that enable the machine 100 to verify a lottery ticket inserted into the ticket slot 120. The ticket scanner 120 is configured to receive a lottery ticket from a user and then the machine 100 can check for the winning status of the ticket by communicating to the lottery service provider server.

The machine 100 includes a valid age document scanner 122 that is used for scanning a valid identity proof of a user before using the machine 100. The valid age document scanner 122 is by default enabled for the machine 100, however the scanner 122 can be disabled as per the preferences of the lottery service provider. The scanned user information may include the identity number of the user for future purposes and may be used in identifying a user associated with the dispensed ticket for the user.

FIG. 2 illustrates a schematic view showing the network connection of the lottery vending machine 100 with the lottery server provider in accordance with the disclosed architecture. As shown, the coin counting lottery machine 100 is coupled to one or more servers, including a central server 202 and a local server 204 for providing enhanced services to the individuals using the vending machine 100. More specifically, the machine 100 is a part of a lottery provider network 200 that includes a plurality of coin counting lottery machines 100 coupled to the network 200.

The servers 202, 204 are used for processing and verifying the status of the lottery ticket scanned by the ticket scanner 120. The scanned ticket number is sent to one or both servers 202, 204 using the communication channel 206 and the status information of the ticket is received by the machine 100 and displayed on the touch screen 112. The processing of the lottery ticket can be done either at the central server 202 or the local server 204 and the combination number of the lottery ticket is comparted with one or more winning ticket numbers at the central server 202 or the local server 204. Additionally, the server 202 may be used for storing the user information in an encrypted form in a user database 2020 integrated with the central server 202. The user information is captured by the valid age document scanner 122 as described in FIG. 1 and is transmitted in an encrypted form through the communication channel 206.

The central server 202 includes a coin information database 208 that stores the information of the number of coins submitted by a user on the machine 100 along with the user identification information. The coin information database 208 also stores the information whether the user opted for cash in exchange for the coins or purchased lottery tickets. This information may be used by lottery service providers for providing more personalized recommendations to the user for increasing sales.

It should be understood that although some of the processing is described as being performed on the central server 202, all the processing can also be performed on the local server 204. Further, the local server 204 can be integrated to the machine 100 or can be installed in physical proximity to the vending machine 100.

For processing cryptocurrency transactions, the machine 100 is connected to a cryptocurrency exchange 210 that enables a user to perform transactions using cryptocurrency. A user can perform transactions using the cryptocurrencies supported by the exchange 210.

FIG. 3 illustrates a block diagram showing internal electronic components essential for working of the coin counting lottery machine 100 in accordance with the disclosed architecture. The block diagram illustrated in FIG. 3 displays the essential electronic components housed within the machine 100 and it should be understood that all the electronic components are connected to each other through one or more wired circuits (not shown). The machine 100 includes a microprocessor 302 that is used for controlling operations of the machine 100. The microprocessor 302 receives signals from electronic components and accordingly actuates an appropriate action. As shown, the machine 100 includes a display processor 304 for displaying various lottery draw tickets and scratch-off options on the front surface 104. The display processor 304 can be configured to display new tickets offered by the lottery service provider. Further, the display processor 304 can be configured remotely in the form of updates by the central server 202 of the service provider. The display processor 304 is further configured to display information on the touch screen 112 of the machine 100.

An identity scanner 306 is configured to read identity information from an identification card in order to identify the user and store identity information of the user. The identity scanner 306 can be a commercially available optical scanner capable of scanning barcodes, for example. The identity information is also stored in the internal memory 320 of the machine 100. A separate ticket scanner 308 is configured to scan the ticket number of a lottery ticket for determining the status (i.e. winning status) of the ticket. The ticket scanner 308 directly scans the barcode on the lottery ticket.

Figure 4:
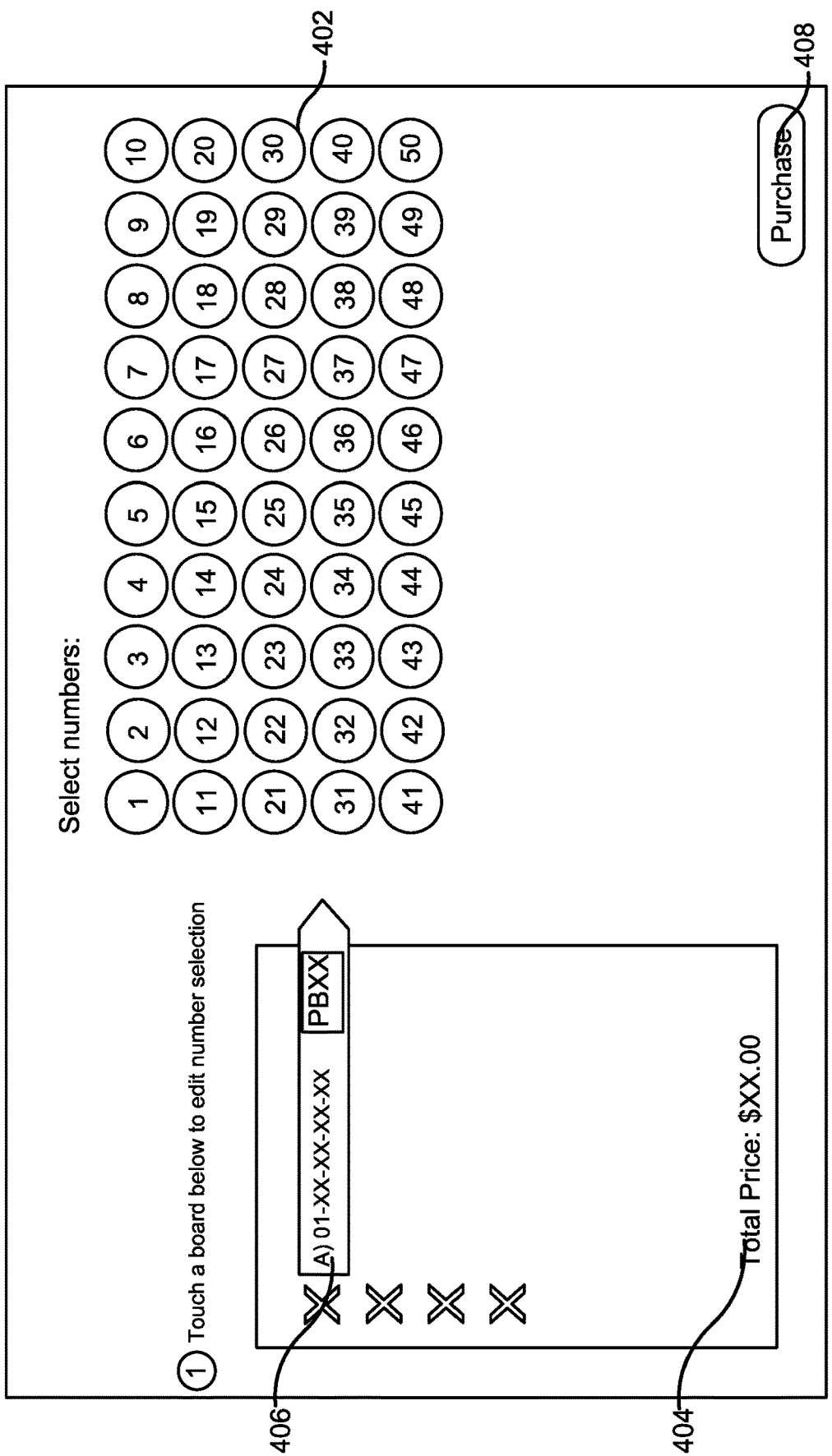
FIG. 4 illustrates a perspective view of the touch screen showing selection of numbers for a lottery ticket before being purchased by a user on the machine in accordance with the disclosed architecture.

A bill scanner 310 is used for scanning a bank note inserted into the machine 100 for buying lottery tickets. The bill scanner 310 scans the note to read the bill amount and accordingly sends an instruction signal to the microprocessor 302. The microprocessor 302 then compares the bill amount with the cost of the lottery ticket selected by a user for purchasing. If the amount of the bill is equal to or more than the price of the selected lottery ticket, then the microprocessor 302 actuates the ticket dispensing module 318 to dispense a ticket. It should be noted that the ticket dispensing module 318 includes a roller 314 of papers which has the selected ticket. When buying a draw lottery ticket, the user can have a random number on the ticket which is preselected by the machine 100 or the user can customize the number as per his or her preference as illustrated in FIG. 4.

A coin counter 312 is a unique feature of the coin counting lottery machine 100. The coin counter 312 is configured to count the coins inserted into the coin slot 114. The coin counter 312 includes a selectable counting speed of up to 500 coins/minute. The coin counter 312 is coupled to a coin holder (not shown) that is adapted to hold up to, for example, 5000 coins. The coin counter 312 is configured to count coins of different denominations, diameters, thicknesses and materials. The coin counter 312 transmits a signal indicating the count (i.e. sum) of the coins and the microprocessor 302 instructs the display processor 304 for displaying the count on the touch screen of the machine 100. The microprocessor 302 also receives the preference of the user to buy lottery tickets or a cash voucher/currency upon completion of the coin counting by the coin counter 312. The microprocessor 302, based upon the selection of the user, actuates either the cash voucher/currency dispensing module 316 for dispensing a cash voucher/currency that includes a value equivalent to the coins or actuates the ticket dispensing module 318 to dispense the selected tickets.

The internal memory 320 can include volatile memory and nonvolatile memory. By way of illustration, and not limitation, nonvolatile memory can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM) and Rambus dynamic RAM.

As it is employed in the subject specification, the term "microprocessor" 302 can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

FIG. 4 illustrates a perspective view of the touch screen showing the selection of numbers for a lottery ticket before being purchased by a user on the machine 100 in accordance with the disclosed architecture. As per the present embodiment, in case a user wants to select the numbers of a ticket to be selected as per his or her preference, then the machine on the touch screen 112 displays the numbers 402 that can be selected by the user for the lottery ticket number. The touch screen displays the lottery ticket amount 404 and the number input by the user as the ticket number 406. Upon completing a desired lottery ticket number 406, a purchase header 408 can be selected to dispense the ticket from the ticket dispenser tray 118.

Figure 5:
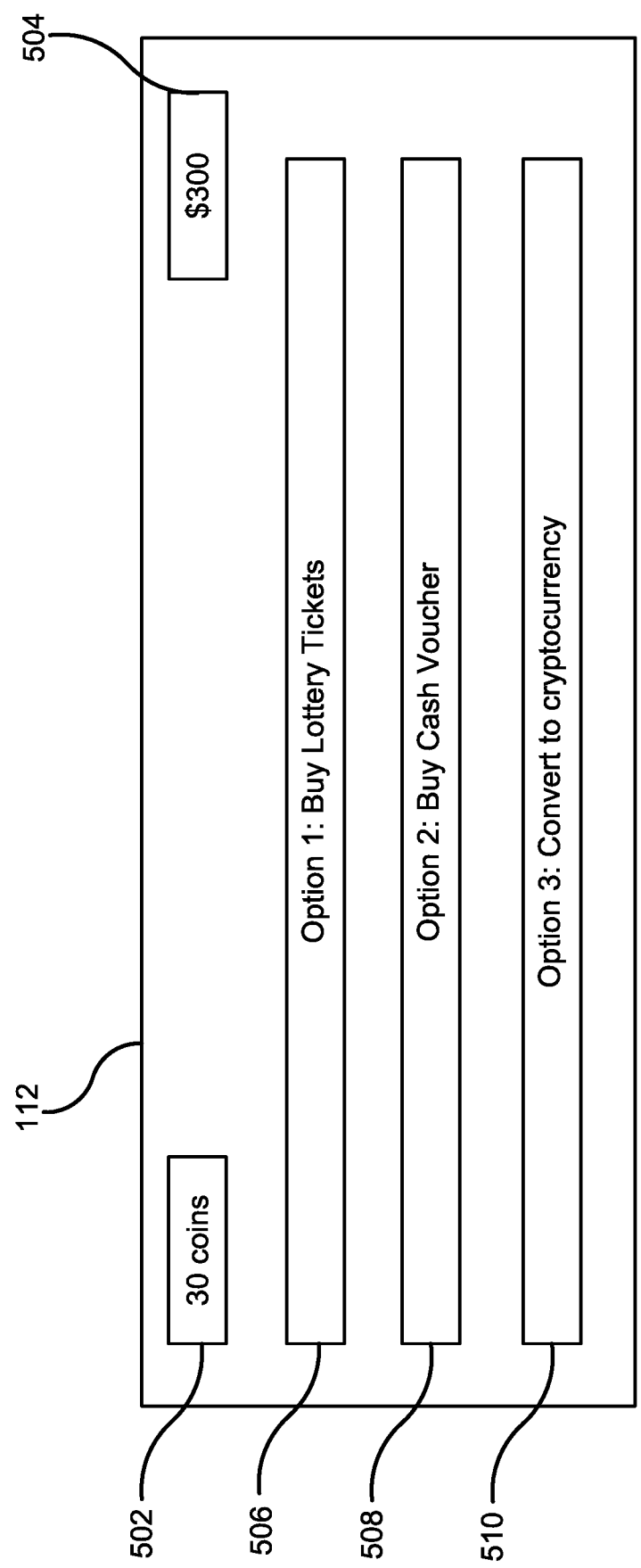
FIG. 5 illustrates a perspective view of the touch screen showing options to a user when coins are inserted into a coin receptacle or slot of the coin counting lottery machine in accordance with the disclosed architecture.

FIG. 5 illustrates a perspective view of the touch screen showing options to a user when coins are placed into the coin receptacle or slot 114 of the coin counting lottery machine 100 in accordance with the disclosed architecture. As shown, the touch screen 112 displays coin count 502 and coin value 504 to the user. Based on the coin value 504, the touch screen 112 displays a first option 506 for buying lottery tickets from the machine 100. The touch screen 112 also displays a second option 508 for purchasing a cash voucher/currency having a value equivalent to the value of the coins 504 counted by the coin counter of the machine 100. As a third option 510, the touch screen 112 provides the option to convert the coins into a cryptocurrency.

The touch screen 112 is also configured to provide options of using cash, coins or cryptocurrency for purchasing tickets. The user can login to the cryptocurrency exchange using the touch screen 112 for purchasing the lottery tickets using the cryptocurrency.

FIG. 6 illustrates a flow diagram showing exemplary steps performed by the machine 100 of the present invention in processing of the inserted coins through the coin receptacle or slot in accordance with the disclosed architecture. As shown, initially coins of various sizes and denominations are received through the coin receptacle (Step 602). Then, in real time the coins are counted and a value is summed by the coin counter and the coins are stored in a coin box (Step 604). Thereafter, the preference of the user is determined based on the option selected by the user as illustrated in FIG. 5 (Step 606). If the user wants to buy a lottery ticket, then the machine dispenses one or more lottery tickets or scratch tickets through the dispenser tray (Step 608). If the user's preference is cryptocurrency, then the machine credits cryptocurrency having a value equivalent to the value of coins (Step 610). Otherwise, the machine 100 prints a cash voucher for the user and dispenses the cash voucher through the dispenser tray (Step 612).

It should be appreciated that the machine 100 can be used as a standalone device or can be connected to a lottery operator network. Further, the machine comes in various dimensions to fit for various applications.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "coin counting lottery machine", "lottery vending machine", "lottery vending machine with integrated coin counter", "lottery machine", and "machine" are interchangeable and refer to the coin counting lottery machine 100 of the present invention.

Notwithstanding the forgoing, the coin counting lottery machine 100 of the present invention can be of any suitable size and configuration as is known in the art without affecting the overall concept of the invention, provided that it accomplishes the above-stated objectives. One of ordinary skill in the art will appreciate that the size, configuration and material of the coin counting lottery machine 100 as shown in the FIGS. are for illustrative purposes only, and that many other sizes and shapes of the coin counting lottery machine 100 are well within the scope of the present disclosure. Although the dimensions of the coin counting lottery machine 100 are important design parameters for user convenience, the coin counting lottery machine 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A lottery vending machine with integrated coin counting capability, the lottery vending machine comprising:
    a coin receptacle for depositing coins;
    a coin counter having a selectable counting speed of up to 500 coins per minute for counting and summing said deposited coins;
    a cash slot for depositing cash;
    a front face comprising a banner indicating a plurality of lottery ticket choices and configured to display a plurality of gameplay choices;
    a touch screen for displaying a coin count, a coin sum, and a cash sum;
    a valid age document scanner for scanning a valid identity proof of a user before using said lottery vending machine;
    a ticket scanner for checking the winning status of a previously purchased lottery ticket; and
    a plurality of options, wherein said plurality of options comprise a first option of purchasing one or more lottery tickets in exchange of said coin sum and said cash sum, a second option of purchasing a cash currency in exchange of said coin sum, and a third option of purchasing a cryptocurrency in exchange of said coin sum and said cash sum, and further wherein said one or more lottery tickets are selected from a display of said lottery vending machine and a dispenser tray dispenses said purchasing of said first option or said second option, wherein purchasing said one or more lottery tickets is in exchange of said cryptocurrency, and further wherein said selecting said plurality of options is accomplished via the touch screen.

2. The lottery vending machine of claim 1, wherein said cryptocurrency is selected from a group consisting of a Bitcoin, a Litecoin and a Ethereum.

3. The lottery vending machine of claim 1 further comprising a connection to one or more lottery service provider servers to enable verification of said winning ticket by communicating with said one or more lottery service provider servers.

4. The lottery vending machine of claim 1, wherein said cash slot comprises an internal scanner that scans said cash deposited in said cash slot for determining said cash sum.

5. A lottery vending machine with integrated coin counting capability, the lottery vending machine comprising:
   a coin receptacle for depositing coins;
   a coin counter for counting and summing said deposited coins;
   a cash slot for depositing cash;
   a front face comprising a banner indicating a plurality of lottery ticket choices and configured to display a plurality of gameplay choices;
   a touch screen for displaying a coin count, a coin sum, and a cash sum;
   a plurality of options, wherein said plurality of options comprise a first option of purchasing one or more lottery tickets in exchange of said coin sum and said cash sum, a second option of purchasing a cash currency in exchange of said coin sum, and a third option of purchasing a cryptocurrency in exchange of said coin sum and said cash sum, and further wherein said one or more lottery tickets are selected from a display of said lottery vending machine and a dispenser tray dispenses said purchasing of said first option or said second option;
   a valid age document scanner for scanning a valid identity proof of a user before using said lottery vending machine;
   a ticket scanner for checking the winning status of a previously purchased lottery ticket; and
   a connection to a coin information database hosted on a central server configured to store information related to whether a user obtained cash or lottery tickets in exchange for deposited coins and to provide a personalized recommendation to a user based on the stored information during a future usage of the lottery vending machine with integrated coin counting capability, wherein purchasing said one or more lottery tickets is in exchange of said cryptocurrency, and further wherein said selecting said plurality of options is accomplished via the touch screen.

6. The lottery vending machine of claim 5 further comprising a connection to one or more lottery service provider servers to enable verification of said winning ticket by communicating with said one or more lottery service provider servers.

7. The lottery vending machine of claim 5, wherein said cash slot comprises an internal scanner that scans said cash deposited in said cash slot for determining said cash sum.

* * * * *